(12) United States Patent
Laschewsky et al.

(10) Patent No.: US 10,782,213 B2
(45) Date of Patent: Sep. 22, 2020

(54) FLUIDIC SYSTEM

(71) Applicant: DIAMOND INVENTION UG, Caputh (DE)

(72) Inventors: André Laschewsky, Potsdam (DE); Erik Wishcherhoff, Potsdam (DE); Carsten Beta, Berlin (DE); Robert Niedl, Berlin (DE)

(73) Assignee: DIAMOND INVENTION UG, Caputh (DE)

( * ) Notice: Subject to any disclaimer, the term of this patent is extended or adjusted under 35 U.S.C. 154(b) by 0 days.

(21) Appl. No.: 14/134,298

(22) Filed: Dec. 19, 2013

(65) Prior Publication Data

US 2014/0178917 A1  Jun. 26, 2014

(30) Foreign Application Priority Data

Dec. 21, 2012  (EP) .................................. 121988356

(51) Int. Cl.
*G01N 1/28* (2006.01)
*B01L 3/00* (2006.01)

(52) U.S. Cl.
CPC .............. *G01N 1/28* (2013.01); *B01L 3/5023* (2013.01); *B01L 3/52* (2013.01); *B01L 2300/0825* (2013.01); *B01L 2400/0677* (2013.01); *Y10T 436/2575* (2015.01)

(58) Field of Classification Search
USPC ........................................................ 422/504
See application file for complete search history.

(56) References Cited

U.S. PATENT DOCUMENTS

| 5,116,644 | A | 5/1992 | Asai et al. |
|---|---|---|---|
| 6,783,992 | B2 * | 8/2004 | Robotti ............. B01L 3/502738 204/455 |
| 7,422,724 | B1 * | 9/2008 | Manginell et al. ............. 422/88 |
| 7,824,854 | B2 | 11/2010 | Arai et al. |
| 2005/0145046 | A1 * | 7/2005 | Blankenstein et al. .... 73/864.34 |
| 2005/0208465 | A1 | 9/2005 | Arai et al. |
| 2006/0021666 | A1 | 2/2006 | Funetsu et al. |
| 2007/0280856 | A1 | 12/2007 | Nakayama et al. |
| 2008/0075848 | A1 | 3/2008 | Kurata et al. |
| 2008/0280285 | A1 * | 11/2008 | Chen et al. ....................... 435/5 |
| 2010/0210037 | A1 * | 8/2010 | Brown et al. ................. 436/518 |
| 2011/0105360 | A1 * | 5/2011 | Derda .................. B01J 19/0046 506/10 |

(Continued)

FOREIGN PATENT DOCUMENTS

| DE | 102007009806 | 9/2008 |
|---|---|---|
| EP | 1504812 | 2/2005 |

(Continued)

OTHER PUBLICATIONS

Niedl, R.R. (2015). "Hydrogel-driven paper-based microfluidics." Lab on a Chip. 15:2452-2459.*

*Primary Examiner* — Benjamin R Whatley
*Assistant Examiner* — Jacqueline Brazin
(74) *Attorney, Agent, or Firm* — JMB Davis Ben-David

(57) ABSTRACT

A fluidic system that includes at least one channel for the transport of a liquid, the channel being formed of an absorbent material; and at least one switchable polymer gel that functions as a storage reservoir and/or valve for the liquid and is in contact with the absorbent material of the channel.

19 Claims, 2 Drawing Sheets

(56) References Cited

U.S. PATENT DOCUMENTS

| | | | | |
|---|---|---|---|---|
| 2011/0111517 A1* | 5/2011 | Siegel | ............... | B01L 3/502707 |
| | | | | 436/164 |
| 2011/0123398 A1* | 5/2011 | Carrilho | ................ | B01L 3/5023 |
| | | | | 422/68.1 |
| 2015/0132742 A1* | 5/2015 | Thuo | ................. | B01L 3/502707 |
| | | | | 435/5 |

FOREIGN PATENT DOCUMENTS

| JP | 2004249381 | 9/2004 |
|---|---|---|
| JP | 2008039541 | 2/2008 |

\* cited by examiner

Figure 1a-c

FLUIDIC SYSTEM

CROSS-REFERENCE TO RELATED APPLICATION

This application claims priority to European Patent Application No. 12198835.6 entitled FLUIDIC SYSTEM filed on Dec. 21, 2012, the entire disclosure of which is hereby incorporated by reference.

FIELD OF INVENTION

The present invention relates to a fluidic system or fluidic device and to a method for the defined release and also the transport and/or the mixing of liquids, using this fluidic system.

BACKGROUND OF THE INVENTION

There are many technical systems in which the storage and handling of liquids is very important. In the case of chemical, biochemical, biological or medical detection methods, in particular, samples or reagents are frequently in liquid form and must be transported and/or mixed at a defined point in time or to a specific event. Frequently it is also necessary for liquid components to be stored in the system for a relatively long time before use.

Where the storage, the defined release, the transport and the mixing of liquid components are to be integrated in one system, this requires, according to the prior art, at least the presence of reservoirs, valves with sometimes complicated switching elements, channels, and mixing devices. Such elements are known, for example, from J. C. Kurnia et al., J. Funct. Biomater., 2, 195-212 (2011) or L. Dong et al., Soft Matter, 3, 1223-1230 (2007) and are also employed. Integrating them into a system, however, represents a considerable effort. While comparatively simple and cost-effective fluidic systems are known, from E. Carrilho et al., Anal. Chem. 81, 7091-7095 (2009), for example, such articles do not offer the functional diversity which is necessary for more complex handling of liquids and samples.

Consequently there continues to be a need for fluidic systems or fluidic devices which not only allow the integration of the functions of reservoirs, valves with diversely deployable switching elements, channels and mixing devices, but are also easy to produce and hence also cost-effective. These fluidic systems are additionally to be capable of diverse possible uses.

SUMMARY OF THE INVENTION

An aspect of the invention is generally directed toward a fluidic system that includes at least one channel configured to transport a liquid, the channel being formed of an absorbent material; and at least one switchable polymer gel configured to be a storage reservoir, a valve for the liquid or both. The at least one switchable polymer gel is in contact with the absorbent material of the channel.

Another aspect of the present invention is generally directed toward method for the release and for the transport and optionally for the mixing of liquids. The method also includes the step of providing a fluidic system that includes at least one channel configured to transport a liquid, the channel being formed of an absorbent material; and at least one switchable polymer gel configured to be a storage reservoir, a valve for the liquid or both. The at least one switchable polymer gel is in contact with the absorbent material of the channel. At least one of the switchable polymer gels is swollen with a liquid. The method also includes the step of changing an external parameter so that at least one of the swollen polymer gels releases its liquid.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessarily to scale. Certain features of the invention may be exaggerated in scale or shown in schematic form in the interest of clarity and conciseness.

FIG. 1$b$ shows the fluidic system of FIG. 1$a$ in a second stage exposed to an external stimulus and the switchable polymer gel in a shrunken or collapsed state and having released liquid into the paper strip. The released liquid is migrating toward the sample.

FIG. 1$c$ shows the fluidic system of FIGS. 1$a$ and 1$b$ in a third stage where the migrating liquid has reached the sample and, if both the released liquid and the sample contain components that may specifically interact, a detection event is triggered.

DETAILED DESCRIPTION

Figure 1:
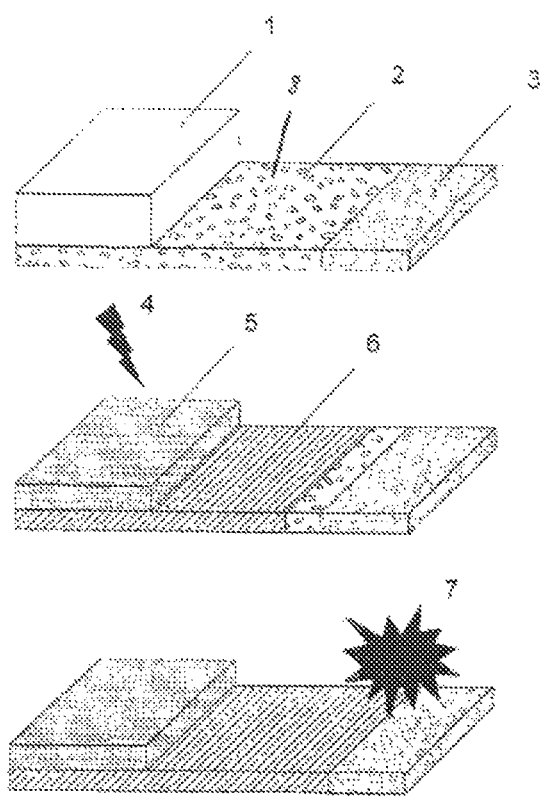
FIG. 1$a$ shows a fluidic system according to an aspect of the present invention with the switchable polymer gel in a first stage with the switchable polymer gel in a swollen, liquid containing state.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

According to a first aspect, the present invention relates to a fluidic system or fluidic device that includes at least one channel for the transport of a liquid, the channel being formed of an absorbent material; and at least one switchable polymer gel that functions as a storage reservoir and/or valve for the liquid and is in contact with the absorbent material of the channel.

For the purposes of the present invention, the channel that is used for liquid transport is formed not, in conventional manner, by a channel with walls and a cavity enclosed by these walls, but instead by an absorbent material which brings about liquid transport via capillary forces.

Furthermore, the fluidic system includes a switchable polymer gel which is able, depending on external parameters, to absorb liquid (and swell in so doing), and subsequently to hold this liquid or else to release it again. Such processes are reversible. Since the absorbent material of the channel is in contact with the switchable polymer gel (that is, there is a contact area or common interface between these two components), liquid transport from the polymer gel to the channel is possible, for example, by exposure to a suitable external stimulus.

The contact area between the switchable polymer gel and the absorbent material of the channel may be realized in a variety of ways.

For example, the polymer gel may lie on the topside 8 of the channel. Where necessary, the polymer gel can be fixed in the fluidic system by means of suitable fixing elements, such as by an adhesive sheet and/or an external housing, for example.

It is possible, furthermore, for the switchable polymer gel to be connected firmly to the absorbent material by embedding or moulding. In this case the polymer gel may function both as storage reservoir and as valve.

The absorbent material may be embedded at least sectionally in the polymer gel.

It is also possible for the purposes of the present invention for the switchable polymer gel to be present between two planes of absorbent materials, as for example between two paper planes. In this case the polymer gel may function as a valve. The polymer gel may be embedded or placed on.

For the purposes of the present invention, the fluidic system is preferably designed such that the polymer gel has no region which is completely surrounded by the channel or by the absorbent material forming the channel. It is preferred, therefore, for the absorbent material not to be present in the form of a tube which surrounds the polymer gel.

For the purposes of the present invention, the valve function is achieved by the phase transition-related collapse in the gel on exposure to the stimulus, and not by purely geometric release/blocking of a channel (as would be the case, for example, if a polymer gel were positioned within a tubular channel).

The fluidic system of the invention permits the integration of the functions of reservoirs, valves with diversely deployable switching elements, channels and mixing devices by very simple means, and is therefore cost-effective. More particularly, the fluidic system does not have any valves with switching elements that are in some cases complicated. The fluidic system, furthermore, may be used with different stimuli for the switching of the reservoirs, thus providing a great diversity of function. The fluidic system additionally allows the precise metering of small amounts of substance at a desired point in time within a very small space.

Suitable absorbent materials, which are able on the basis of capillary forces to bring about liquid transport, are known in principle to the skilled person. Mention may be made in this context, by way of example, of cellulose-containing materials.

In one preferred embodiment, the absorbent material of the channel comprises paper or nitrocellulose, or combinations or mixtures of these materials.

For the purposes of the present invention, it is possible for only one switchable polymer gel to be in contact with the absorbent material of the channel (i.e. one switchable polymer gel per channel). Alternatively it is also possible for two or more switchable polymer gels to be in contact with the absorbent material of the channel (i.e. two or more switchable polymer gels per channel), and in this case the polymer gels are of course mounted at different positions of the channel—for example, at each of the ends of the channel.

It is also possible, furthermore, for the switchable polymer gel to be in contact with the absorbent materials of at least two different channels, i.e. to connect two or more channels to one another, thus permitting liquid transfer between these channels.

For the purposes of the present invention it is possible to realize a multiplicity of different channel structures. In the simplest case, the course of the channel is linear and there are no junctions. It is also possible, however, for the channel to have at least one junction, as for example one or more T and/or Y and/or X junctions.

In the application of the fluidic systems, these junction points may also function as mixing regions or mixing zones, in which liquids released from different polymer gels impinge on one another, i.e. come into contact and become mixed.

The absorbent material forming the channel ought not to be too thick, so that there is extremely rapid diffusion of the liquid in the plane direction. The thickness of the absorbent material is suitably not more than 1 mm, more preferably not more than 200 µm.

Depending on the intended use of the fluidic system, the width of the channel may be varied over a wide range. A range from about 10 µm to 10 mm may be stated as a suitable width of the channel, for example.

For the purposes of the present invention, the fluidic system may also be sized in such a way that it constitutes a microfluidic system. A "microfluidic system" is typically understood by the skilled person to be a miniaturized system which is suitable for the storage, delivery and/or processing of small amounts of liquid: for example, of amounts of liquid totaling less than 1000 µl or even, indeed, less than 10 µl.

The fluidic system may comprise a paper substrate which has one or more absorbent regions and one or more non-absorbent regions, with the channel or channels being formed by the absorbent region or regions.

A structured paper substrate of this kind may be produced by commonplace methods known to the skilled person, such as a photolithographic microstructuring, for example, or by the defined application of wax (via a printing device or printer, for example), thus forming hydrophobic regions which are therefore no longer absorbent. The principle is elucidated in A. W. Martinez et al., Lab Chip (2008) 8, 2146, for example.

The fluidic system may have a heating element and/or cooling element which are or is in thermal contact with the channel and/or with the switchable polymer gel. In this way it is possible to control the release of the liquid from the switchable polymer gel in a more targeted way.

The fluidic system of the present invention has a switchable polymer gel that functions as a storage reservoir and/or valve for the liquid and is in contact with the absorbent material of the channel.

A polymer gel is understood to be a three-dimensional network which in a solvent is no longer soluble but instead absorbs this solvent and, in so doing, swells. Where the swelling agent is water, the gels are referred to as hydrogels. Crosslinking of the polymers may be physical or chemical. In the case of a physically cross-linked gel, the network nodes are formed by interlooping and interentanglement of long polymer chains with one another. Network nodes may also be formed by physical interactions, such as electrostatic interactions, for example. In the case of chemically cross-linked gels, the nodal points are formed by covalent bonds between the polymer chains.

Switchable polymer gels are understood by the skilled person to be those polymer gels which are able on exposure to an external stimulus (i.e. under the action of an external, changing parameter) to swell with absorption of liquid or alternatively to collapse with release of liquid. These transitions are preferably reversible.

Such polymer gels are known in principle to the skilled person.

Materials suitable for the switchable polymer gel, more particularly the switchable hydrogel, are primarily those which exhibit a volume phase transition. This transition may be based on a lower and/or an upper critical solution temperature. Within such a system, the temperature serves as the switch. The liquid is released when the temperature is above or below a threshold temperature. Systems of this kind may be modified by the installation of additional groups which change their hydrophilicity on exposure to a stimulus other than the temperature. Through response to this other stimulus, it is possible, within a particular temperature range, for diverse other switching phenomena to be realized. Systems of this kind are described in M. Irie, Adv. Polym. Sci. 110, 43-65 (1993), for example. Thus, for example, pH, ionic strength, light or chemical reactions may serve as switches. Given appropriate design of the system, complex biomacromolecules as well, as proteins, may function as a stimulus. Systems of this kind are described in J. Buller et al., Polym. Chem. 2, 1486-1489 (2011), for example.

Examples of groups which induce switchability with light are azobenzenes (R. Kroger et al., Macromol. Chem. Phys. (1994) 195, 2291-2298; H. Akiyama et al., Macromolecules (2007) 40, 5129-5132), spiropyrans (Edahiro et al., Biomacromolecules (2005) 6, 970-974) or derivatives of the dye malachite green. Examples of groups which bring about switchability by the pH are amino groups or carboxyl groups. An example of switchability by way of a chemical reaction is described in P. Mi et al., Macromol. Rapid Commun. (2008) 29, 27-32.

In preferred embodiments, the polymer gels are gels which are switchable by means of an external stimulus (i.e. by changing of an external parameter) which is selected from temperature, pH, ionic strength, ionic type, electromagnetic radiation (more particularly light), a chemical reaction, the presence (addition or exchange) of chemical (more particularly low molecular mass) or biochemical reagents, or by exposure to biomolecules such as proteins, or combinations thereof.

The switchable polymer gel is preferably a switchable hydrogel, i.e. a polymer gel which is swellable by water. Alternatively or in combination with a hydrogel, it is also possible, for the purposes of the present invention, to use polymer gels which are swellable with an organic liquid. Examples of polymers which may serve as a parent or basic structure for gels having a lower critical solution temperature in organic liquids are described in Z. Liu et al., Polymer Journal (2010) 42, 901-904 and K.-I. Zeno et al., J. Polym. Sci. A (2008), 46(17), 5724-5733.

The switchable hydrogel may be a temperature-sensitive hydrogel having an upper critical solution temperature. Examples of polymers which may serve as a parent or basic structure for hydrogels having an upper critical solution temperature are given in J. Seuring et al., Macromolecules (2012, 45, 3910-3918).

The switchable hydrogel may also be a temperature-sensitive hydrogel having a lower critical solution temperature. Examples of polymers which may serve as a parent structure for hydrogels having a lower critical solution temperature are set out in the following list:

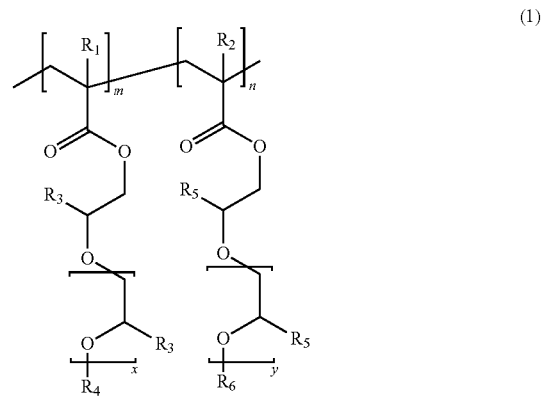

(1)

where
$R_1$ and $R_2$=H or alkyl such as $C_{1-4}$ alkyl,
$R_3$ and $R_5$=H or alkyl such as $C_{1-4}$ alkyl,
$R_4$ and $R_6$=H or alkyl such as $C_{1-4}$ alkyl, allyl, phenyl, benzyl or acyl,
x and y independently of one another are 1-50, more preferably 2-20,
$4 \leq m+n \leq 10^7$;

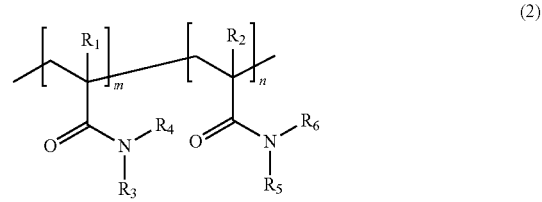

(2)

where
$R_1$ and $R_2$=H or alkyl such as $C_{1-4}$ alkyl,
$R_3$, $R_4$, $R_5$ and $R_6$=H or alkyl such as $C_{1-4}$ alkyl, allyl, phenyl or benzyl,
$4 \leq m+n \leq 10^7$;

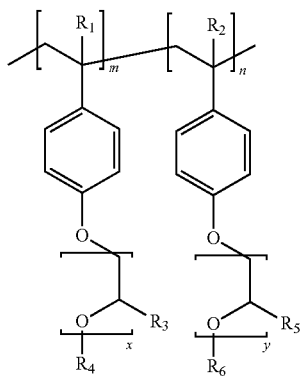
(3)

where
$R_1$ and $R_2$=H or alkyl such as $C_{1-4}$ alkyl,
$R_3$ and $R_5$=H or alkyl such as $C_{1-4}$ alkyl,
$R_4$ and $R_6$=H or alkyl such as $C_{1-4}$ alkyl, allyl, phenyl, benzyl or acyl,
x and y independently of one another are 1-50, more preferably 2-20,
$4 \leq m+n \leq 10^7$;

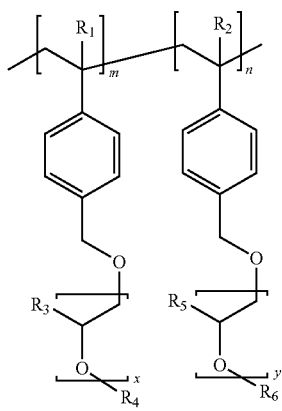
(4)

where
$R_1$ and $R_2$=H or alkyl such as $C_{1-4}$ alkyl,
$R_3$ and $R_5$=H or alkyl such as $C_{1-4}$ alkyl,
$R_4$ and $R_6$=H or alkyl such as $C_{1-4}$ alkyl, allyl, phenyl, benzyl or acyl,
x and y independently of one another are 1-50, more preferably 2-20,
$4 \leq m+n \leq 10^7$;

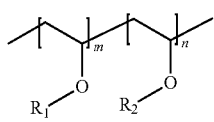
(5)

where
$R_1$ and $R_2$=H or alkyl such as $C_{1-4}$ alkyl,
$4 \leq m+n \leq 10^7$;

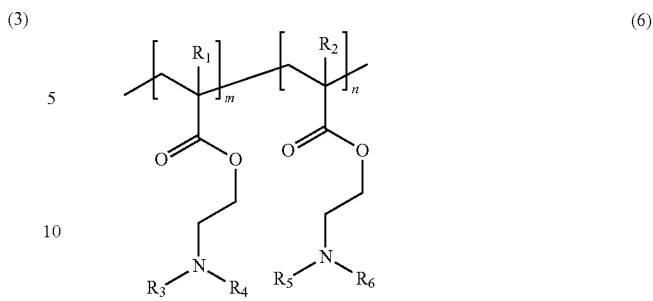
(6)

where
$R_1$ and $R_2$=H or alkyl such as $C_{1-4}$ alkyl,
$R_3$ and $R_5$=H or alkyl such as $C_{1-4}$ alkyl,
$R_4$ and $R_6$=H or alkyl such as $C_{1-4}$ alkyl, allyl, phenyl, benzyl or acyl,
$4 \leq m+n \leq 10^7$;

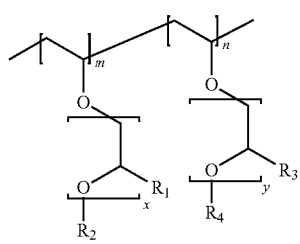
(7)

where
$R_1$ and $R_3$=H or alkyl such as $C_{1-4}$ alkyl,
$R_2$ and $R_4$=H or alkyl such as $C_{1-4}$ alkyl, allyl, phenyl, benzyl or acyl,
x and y independently of one another are 1-50, more preferably 2-20,
$4 \leq m+n \leq 10^7$;

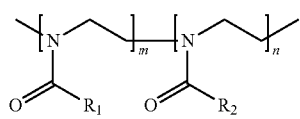
(8)

$R_1$ and $R_3$=H or alkyl such as $C_{1-4}$ alkyl, allyl, phenyl or benzyl,
$4 \leq m+n \leq 10^7$;

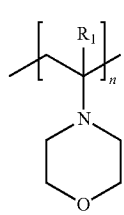
(9)

$R_1$=H or alkyl such as $C_{1-4}$ alkyl, n>5;

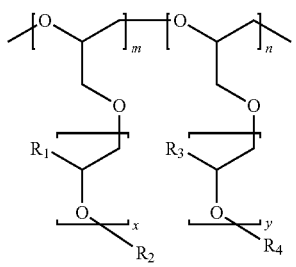

(10)

$R_1$ and $R_3$=H or alkyl such as $C_{1-4}$ alkyl, $R_2$ and $R_4$=H or alkyl such as $C_{1-4}$ alkyl, allyl, phenyl, benzyl or acyl, x and y independently of one another are 1-50, more preferably 2-20, $4 \leq m+n \leq 10^7$;

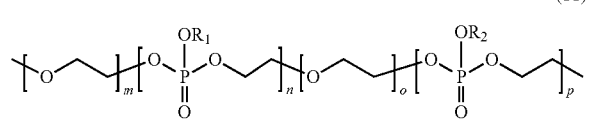

(11)

$R_1$ and $R_2$=H or alkyl such as $C_{1-4}$ alkyl, $4 \leq m+n+o+p \leq 10^7$;

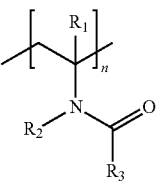

(12)

$R_1$=H or alkyl such as $C_{1-4}$ alkyl, x for the heterocyclic ring is 2 to 6, n for the number of monomer units in the polymer chain is greater than 5, e.g.

$6 \leq n \leq 10^7$;

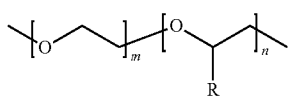

(13)

R=alkyl, preferably methyl,

10>m:n>0.1;

$4 \leq m+n \leq 10^7$;

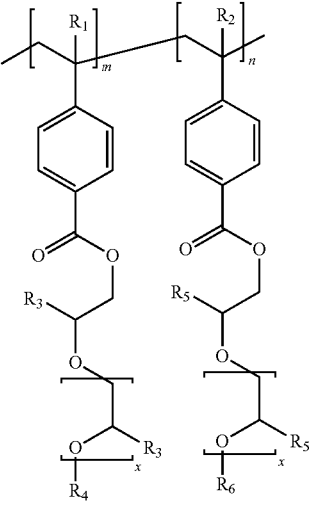

(14)

where
$R_1$ and $R_2$=H or alkyl such as $C_{1-4}$ alkyl,
$R_3$ and $R_5$=H or alkyl such as $C_{1-4}$ alkyl,
$R_4$ and $R_6$=H or alkyl such as $C_{1-4}$ alkyl, allyl, phenyl, benzyl or acyl,
x and y independently of one another are 1-50, more preferably 2-20,
$4 \leq m+n \leq 10^7$;

(15)

$R_1$ and
$R_2$=H or alkyl such as $C_{1-4}$ alkyl, $R_3$=alkyl such as $C_{1-4}$ alkyl, allyl, phenyl or benzyl, $4 \leq n \leq 10^7$; and

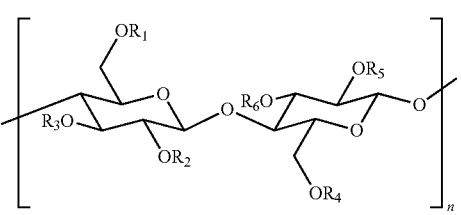

(16)

$R_1$, $R_2$, $R_3$, $R_4$, $R_5$ and $R_6$=H or alkyl such as $C_{1-4}$ alkyl, allyl, phenyl, benzyl or acyl, $4 \leq n \leq 10^7$.

Examples of crosslinkers are difunctional or polyfunctional acrylic, methacrylic, vinyl or allyl monomers. Chemical crosslinking, however, is also possible via photochemical reactions if the starting point is a soluble precursor polymer which carries, for example, diazirine units, acetophenone units or benzophenone units. It is also possible, furthermore, to install functional groups into a precursor polymer that then form covalent bonds with complementary functional groups on difunctional or polyfunctional crosslinker molecules. Examples of suitable complementary groups are given in E. Wischerhoff et al., Adv. Polym. Sci. (2011) 240: 1-33.

For the purposes of the present invention, it may be preferable for the liquid present in the swollen state in the switchable polymer gel to have a component dissolved or dispersed therein that is selected from a chemical or biochemical reagent, an active biological ingredient, an active pharmaceutical ingredient, an allergen, an antigen, an antibody, an enzyme, a protein and mixtures of these. The presence of such an additional component provides the option, for example, of specific analytical detection reactions. This additional component is preferably one or more constituents of a chemical, biological or medical assay. In this context it is possible for two or more of these additional components to be distributed over different switchable polymer gels in the fluidic system, and to not come into contact with one another until the liquids are released, on exposure to an external stimulus, and to impinge on one another at particular locations in the channel (for example at junction points in the channel).

The channel of the fluidic system of the invention may also have at least one non-switchable region at which a component is located that is selected from a chemical or biochemical reagent, an active biological ingredient, an active pharmaceutical ingredient, an allergen, an antigen, an antibody, an enzyme, a protein and mixtures of these. If the switchable polymer gel releases a liquid which comprises one of the abovementioned additional components, or optionally a compound for analytical detection, and this liquid migrates via the channel to the non-switchable region, a corresponding analytical detection reaction may occur there.

According to a further aspect, the present invention relates to a method for the release and for the transport and optionally for the mixing of liquids that includes at least the following steps: providing the above-described fluidic system of the invention, at least one of the switchable polymer gels being swollen with a liquid; and changing an external parameter, so that at least one of the swollen polymer gels releases its liquid.

The polymer gel is converted into its swollen state in a customary way known to the skilled person. For this purpose, the dry polymer gel is contacted with a sufficient amount of the liquid until the polymer gel, finally, is in the swollen state. During the conversion into the swollen state, the polymer gel may already be present on the substrate. Alternatively the polymer gel may first be converted to the swollen state at an external location, and only then mounted on the substrate.

As already elucidated above, the release of the liquid (i.e. the switching of the polymer gel) takes place preferably as a result of a change of temperature, pH, ionic strength, ionic type, electromagnetic radiation (more particularly light), by a chemical reaction, by the presence (addition or exchange) of chemical (more particularly low molecular mass) or biochemical reagents, or by exposure through or interaction with biomolecules such as proteins, or by combinations thereof.

The method of the invention has a high flexibility. Thus, for example, the fluidic system may have two or more swollen switchable polymer gels, and the changing of the external parameter takes place as a function of time, in such a way that all of the swollen polymer gels release their liquid at the same time. Alternatively, the changing of the external parameter may take place as a function of time in such a way that the swollen polymer gels release their liquid with a time offset relative to one another.

The releasing of the liquid may also be influenced by the additional attachment of or exposure to a heating element or cooling element. By means of a heating or cooling element of this kind it is possible for different sections of a channel or for different channels and/or different polymer gels to be brought to a different temperature, thereby making it possible to exert a targeted influence over the release of the liquid from the swollen switchable polymer gels.

The temperatures, for example, may be selected such that one of the switchable swollen polymer gels releases its liquid, while another swollen polymer gel still retains its liquid.

In one preferred embodiment, the fluidic system has two or more swollen switchable polymer gels, and the liquids, after release thereof into the absorbent material of the channel, impinge on one another in a mixing region and become mixed.

The mixing region may be located, for example, at a junction point of the channel.

The fluidic system of the present invention is suitable for use in the implementation of a chemical, biological or medical assay.

The chemical, biological or medical assay may be carried out, for example, such that the liquid of the swollen polymer gel has a dissolved or dispersed component which is selected from a chemical or biochemical reagent, an active biological ingredient, an active pharmaceutical ingredient, an allergen, an antigen, an antibody, an enzyme, a protein and mixtures of these; a sample for analysis is introduced into the fluidic system; and the liquid, following its release into the absorbent material of the channel, migrates to the sample.

An exemplary embodiment is described in FIG. 1a-c.

A hydrogel block swollen with liquid and composed of a switchable polymer gel (1) is contacted with an absorbent strip (2) of paper, allowing cross-over of the liquid stored in the hydrogel. At the other end, the strip of paper is impregnated with a reagent (3), which is able, for example, to trigger a colour reaction with the liquid from the hydrogel. In the hydrophilic state, the hydrogel holds the liquid; there is no cross-over into the paper as yet. If the hydrogel is then exposed to an external stimulus (4), it switches into a hydrophobic state (5), it collapses, and the liquid is released. As a result of the direct contact, the liquid is then drawn into the paper (6) and passes by capillary forces to the location of action, in this case the reagent-impregnated part of the paper strip. At the location of action, the liquid impinges on the reagent, where it triggers an optically recognizable detection reaction (7).

EXAMPLES

A. Stimuli-Controlled Filling of a Channel in a Substrate

The stimuli-controlled filling of a channel was carried out in a paper substrate. For this purpose, photolithographic microstructuring was used to impress four parallel channels on a paper substrate. The parallel channels impressed are each in contact with a poly(N-isopropylacrylamide) hydrogel [poly(NIPAM) hydrogel]. The hydrogels were contacted with the circular end regions on the right-hand side of the paper substrate, and fixed. Black ink was incorporated into the hydrogels and released at different temperatures (heating plate temperature 30.2° C. left, 37.2° C. right). In both experiments the temperature between the channels was also varied such that the upper channel was in direct contact with the heating plate, while between the lower channels and the heating plate there was additionally at least one insulating paper layer. The slight temperature differences between the individual channels (with increasing number of insulating paper layers) led to clear differences in the quantities of liquid released in the respective channel.

B. Stimuli-Controlled Mixing of Substances in a Substrate

Figure 2:
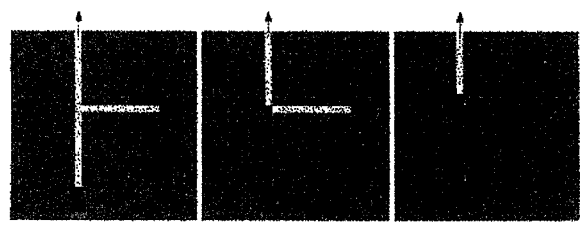
FIG. 2 shows a fluidic system according to another aspect of the present invention showing a T-shaped fluidic system at three different stages with stage 1 on the left, stage 2 in the middle and stage 3 on the right. Stage 1 has two polymer gels with no liquid released yet. Stage 2 shows just the polymer gel positioned on the bottom end exposed to an external stimulus and therefore has its liquid released into the paper strip. The migrating liquid has passed the T-junction. The second polymer gel is in its swollen state. Stage 3 (right side) is at a later point in time when the second polymer gel has been exposed to external stimulus and its liquid released. The released liquid from the second polymer gel is shown having reached the T-junction where mixing with liquid released from the first polymer gel takes place.

The stimuli-controlled mixing of substances was carried out in a paper substrate. Stimuli-controlled mixing of substances may be accomplished by successive serial hydrogel collapse or simultaneous serial hydrogel collapse. For this purpose, photolithographic microstructuring was used to impress a T-shaped channel on a paper substrate. FIG. 2 shows a paper substrate of this kind. The end regions of the impressed T-shaped channel are each in contact with a poly(NIPAM) hydrogel. Through combination of different hydrogel deposits in the microfluidic substrate it is possible for different substances to be released with a time offset, by collapse of the corresponding hydrogel reservoirs, and injected into the microfluidic system. At the T-shaped connecting point, the substances injected are mixed. Depending on the structure of the channel network, the substances may be contacted with one another at different locations on the substrate, in order specifically to initiate mixing and reaction processes.

C. Stimuli-Controlled Enzymatic Assay

The stimuli-controlled enzymatic assay, using as example a detection reaction for glucose, was carried out in a paper substrate. For this purpose, photolithographic microstructuring was used to impress a mixing region which is in contact with correspondingly impressed channels on a paper substrate. The impressed channels are each connected in turn to an impressed reservoir region which is in contact in each case with a poly (NIPAM) hydrogel.

In a first hydrogel, horseradish peroxidase (HRP) was incorporated; in a second hydrogel, glucose oxidase was incorporated. As a result of collapse of these hydrogel reservoirs, horseradish peroxidase and glucose peroxidase were transported into the impressed mixing region (right-hand test field), where they were mixed. A sample solution containing glucose was then applied to the impressed mixing region. Introducing a sharp fold into the paper substrate brought the sensor area, disposed on the left-hand side in an impressed region and containing TMB (3,3',5,5'-tetramethylbenzidine), into contact with the impressed mixing region, and initiated the detection reaction.

The assay features a minimal cut-off of 0.5 mg/ml. Through appropriate configuration (amount of the detection reagents), therefore, it can be adjusted both for the lower limit (0.8 mg/ml) and for the upper limit (1.8 mg/ml) of the physiologically normal sugar concentration in the blood of a human subject.

The invention claimed is:

1. A fluidic system comprising:
   a substrate formed by at least one absorbent material having one or more absorbent regions and one or more non-absorbent regions, the one or more absorbent regions forming one or more channels configured to transport a liquid via capillary forces through the absorbent material; wherein the one or more channels are not formed by walls and a cavity enclosed by walls; and
   at least one switchable polymer gel configured to be a storage reservoir,
   wherein the at least one switchable polymer gel is in contact with the one or more absorbent regions forming the channel, wherein if swollen with a liquid, the at least one switchable polymer gel is adapted to release the liquid upon changing an external parameter.

2. The fluidic system of claim 1, wherein the absorbent material is a cellulose-containing material.

3. The fluidic system of claim 2, wherein the absorbent material is paper or nitrocellulose.

4. The fluidic system of claim 1, wherein the at least one absorbent material forming the channel comprises a topside and the switchable polymer gel lies on the topside.

5. The fluidic system of claim 3, wherein the one or more absorbent regions forming the channel comprises a topside and the switchable polymer gel lies on the topside.

6. The fluidic system of claim 1, wherein the switchable polymer gel is embedded or molded to the at least one absorbent material or the one or more absorbent regions.

7. The fluidic system of claim 5, wherein the switchable polymer gel is embedded or molded to the at least one absorbent material or the one or more absorbent regions.

8. The fluidic system of claim 1, wherein at least two switchable polymer gels contact: the one or more absorbent regions forming the channel; the one or more absorbent regions forming the one or more channels where the one or more channels have one or more junctions; or both.

9. The fluidic system of claim 7, wherein at least two switchable polymer gels contact: the one or more absorbent regions forming the one or more channels; the one or more absorbent regions forming the one or more channels where the one or more channels have one or more junctions; or both.

10. The fluidic system of claim 9, wherein the at least two switchable polymer gels contact the channel having one or more junctions wherein the one or more junctions comprise one or more junctions chosen from the group consisting of T junctions, X junctions, Y junctions, and combinations thereof.

11. The fluidic system of claim 10, further comprising a heating element, a cooling element or both, wherein the heating element or cooling element is or are in thermal contact with the one or more channels, in thermal contact with the switchable polymer gel, or in thermal contact with both the one or more channels and the switchable polymer gel.

12. The fluidic system of claim 1, wherein the switchable polymer is a switchable hydrogel.

13. The fluidic system of claim 10, wherein the switchable polymer is a switchable hydrogel.

14. The fluidic system of claim 13, wherein the liquid is present in the switchable polymer gel in a swollen state having a component dissolved or dispersed therein, which is a component chosen from the group consisting of a chemical reagent, a biochemical reagent, an active biological ingredient, an active pharmaceutical ingredient, an allergen, an antigen, an antibody, an enzyme, a protein and mixtures thereof.

15. A method for the release and transport and optionally for the mixing of liquids, comprising at least the steps of:
   providing a fluidic system of claim 1 wherein at least one of the switchable polymer gels is swollen with liquid; and
   changing an external parameter, so that at least one of the swollen polymer gels releases its liquid.

16. The method of claim 15, wherein release of the liquid occurs as a result of a change of: temperature, pH, ionic strength, ionic type, electromagnetic radiation, light as a result of a chemical reaction, as a result of the presence of chemical or biochemical reagents or exposure through biomolecules, or as a result of combinations thereof.

17. The method of claim 16, wherein the fluidic system has two or more swollen switchable polymer gels and the changing of the external parameter takes place as a function of time in such a way that all of the swollen polymer gels release their liquid simultaneously, or the changing of the external parameter takes place as a function of time such that the swollen polymer gels release their liquid with a time offset relative to one another.

18. The method of claim 17, wherein the fluidic system has two or more swollen switchable polymer gels, and the liquids, following their release into the absorbent region forming the one or more channels, impinge on one another in a mixing region and become mixed therein.

19. The method of claim 18, wherein a chemical, biological or medical assay is carried out, such that the liquids of the swollen polymer gels have a dissolved or dispersed component selected from the group consisting of a chemical reagent, a biochemical reagent, an active biological ingredient, an allergen, an antigen, an antibody, an enzyme, a protein and mixtures thereof; wherein the method further comprises the step of introducing a sample for analysis into a fluidic system; and the liquid, following into its release into the absorbent material forming the channel, migrates into the sample.

* * * * *